(12) United States Patent
Wang et al.

(10) Patent No.: US 7,492,609 B2
(45) Date of Patent: Feb. 17, 2009

(54) FLAT PANEL DISPLAY WITH SINGLE SHIELDED CIRCUIT BOARD

(75) Inventors: Te-Hsu Wang, Miao-Li (TW);
Ming-Chuan Li, Miao-Li (TW);
Ju-Fang Wang, Shenzhen (CN)

(73) Assignees: Innocom Technology (Shenzhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 309 days.

(21) Appl. No.: 11/442,777

(22) Filed: May 30, 2006

(65) Prior Publication Data
US 2006/0268193 A1      Nov. 30, 2006

(30) Foreign Application Priority Data
May 27, 2005      (TW) .............................. 94208718 U

(51) Int. Cl.
*H05K 9/00*      (2006.01)

(52) U.S. Cl. .................................................... 361/816
(58) Field of Classification Search ................. 361/816, 361/818, 820, 728, 736
See application file for complete search history.

(56) References Cited

U.S. PATENT DOCUMENTS 6,362,860 B1      3/2002      Sagawa

*Primary Examiner*—Javaid Nasri
(74) *Attorney, Agent, or Firm*—Wei Te Chung

(57) ABSTRACT

An exemplary flat panel display (1) includes a display panel (20), a circuit board (30) and a metal shield (40). The display panel includes a first back (200). The metal shield is secured at the first back of the display panel, including a first housing (45) portion adjacent the first back of the display panel. The circuit board including a power unit (302), a display unit (304) and a switch unit (306) integrated on the circuit board that is accommodated in the first housing portion. An area of the metal shield is smaller than that of the display panel. The flat panel display is convenient for assembly in a reduced weight and a lowered cost.

16 Claims, 4 Drawing Sheets

FLAT PANEL DISPLAY WITH SINGLE SHIELDED CIRCUIT BOARD

FIELD OF THE INVENTION

The present invention relates to flat panel displays, and more particularly to a flat panel display that shields electromagnetic interference (EMI) and is relatively light in weight.

GENERAL BACKGROUND

Flat panel displays (FPDs) are commonly used as display devices for compact electronic apparatuses. Referring to FIG. 4, a conventional flat panel display 8 includes a front frame 80, a display panel 82, an interface board 83, a power board 84, a switch board 85, a metal shield 86, and a rear frame (not shown) arranged in that order. The metal shield 86 is for shielding EMI. The display panel 82, the interface board 83, the power board 84, the switch board 85 and the metal shield 86 are secured between the front frame 80 and the rear frame. Because the interface board 83, the power board 84 and the switch board 85 are separate, a total area of the metal shield 86 needs to substantially approximately the same as that of the display panel 82, in order that the metal shield 86 can cover all of the interface board 83, the power board 84 and the switch board 85. This can make assembly of the flat panel display 8 awkward and cumbersome, and also makes the flat panel display 8 unduly heavy.

What is needed, therefore, is a flat panel display that can overcome the above-described deficiencies.

SUMMARY

An exemplary flat panel display includes a display panel, a circuit board and a metal shield. The display panel includes a first back. The metal shield is secured at the first back of the display panel, including a first housing portion adjacent the first back of the display panel. The circuit board including a power unit, a display unit and a switch unit integrated on the circuit board that is accommodated in the first housing portion. An area of the metal shield is smaller than that of the display panel. The flat panel display is convenient for assembly in a reduced weight and a lowered cost.

Other advantages and novel features will become more apparent from the following detailed description when taken in conjunction with the accompanying drawings. In the drawings, all the views are schematic.

DETAILED DESCRIPTION OF PREFERRED EMBODIMENTS

Reference will now be made to the drawings to describe the preferred embodiments in detail.

Figure 1:
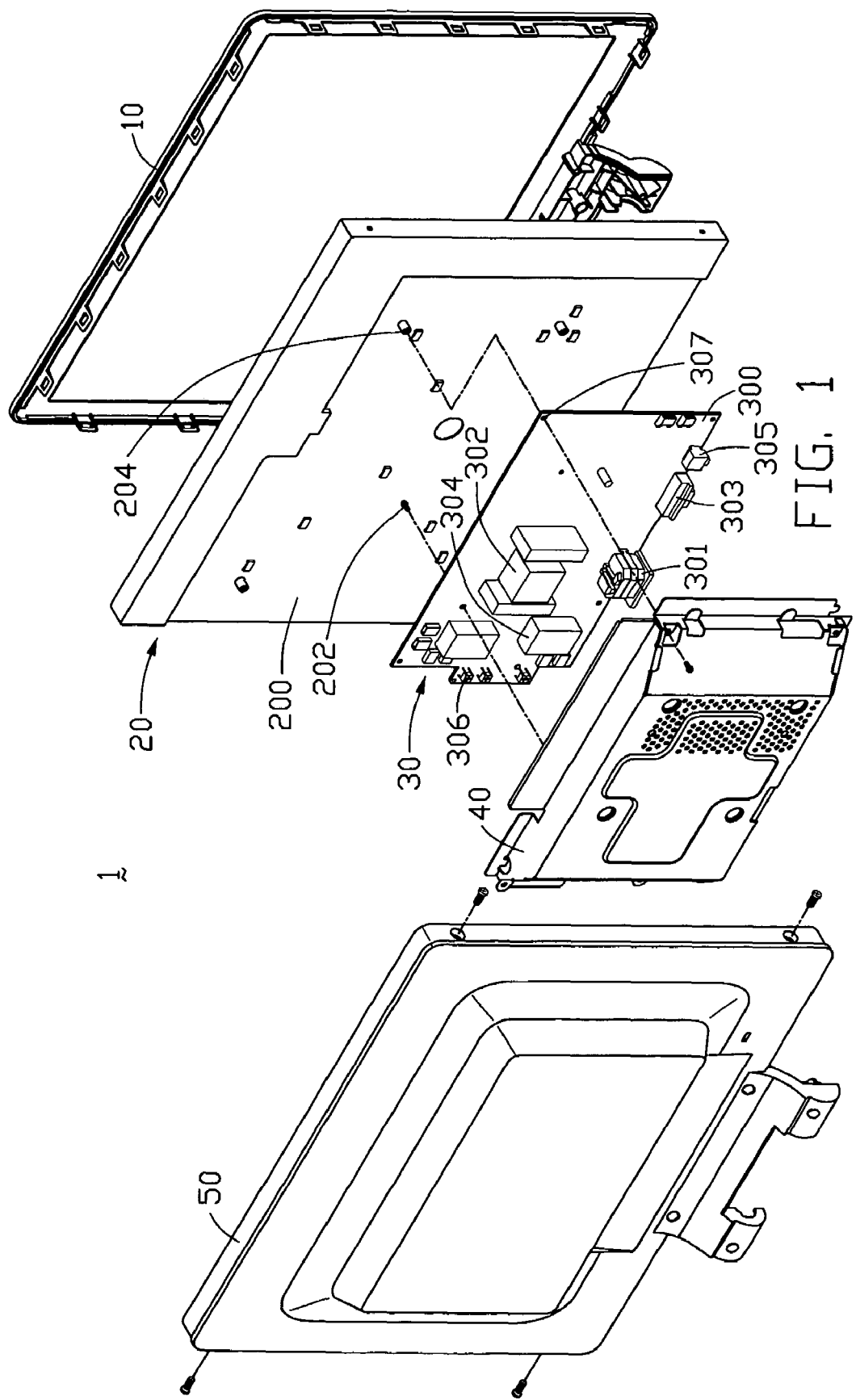
FIG. 1 is an exploded, isometric view of a flat panel display according to a preferred embodiment of the present invention, the flat panel display including a rear frame, a metal shield, a circuit board, a display panel, and a front frame.
Figure 2:
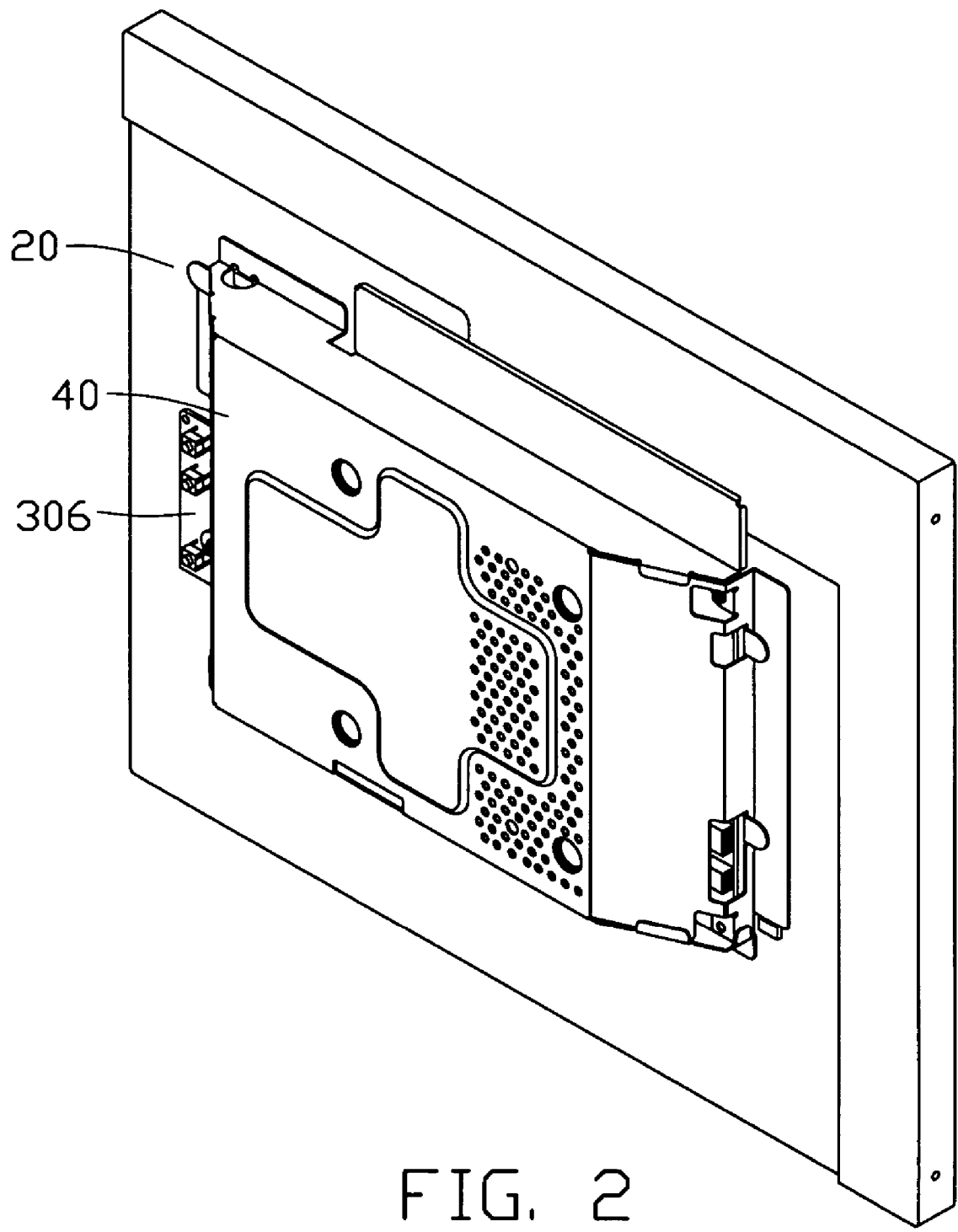
FIG. 2 is an assembled view of the flat panel display of FIG. 1, but not showing the rear frame and the front frame thereof.

Referring to FIG. 1 and FIG. 2, a flat panel display 1 according to a preferred embodiment of the present invention includes a front frame 10, a display panel 20, a circuit board 30, a metal shield 40, and a rear frame 50 arranged in that order from right to left. The front frame 10 and the rear frame 50 can cooperate to secure the display panel 20, the circuit board 30 and the metal shield 40 therebetween.

The display panel 20 includes a first back 200 facing the circuit board 30. The first back 200 includes two bolts 202 (not all visible) and four studs 204 (not all visible) arranged thereon. The circuit board 30 includes a second back 300 facing the metal shield 40. The second back 300 includes a power unit 302, an interface unit 304, and a switch unit 306 integrated thereon. The power unit 302 is disposed at a center (not labeled) of the second back 300. The interface unit 304 is disposed at a bottom left corner (not labeled) of the second back 300. The switch unit 306 is disposed at a left side (not labeled) of the second back 300. The second back 300 further includes a power socket 301, a video graphics array (VGA) socket 303 adjacent to the power socket 301, an audio socket 305 adjacent to the video graphics array socket 303, and six through holes 307. The power socket 301, the video graphics array socket 303 and the audio socket 305 are all arranged along a bottom edge (not labeled) of the circuit board 30. The through holes 307 are positioned corresponding to the bolts 202 and the studs 204 of the display panel 20.

Figure 3:
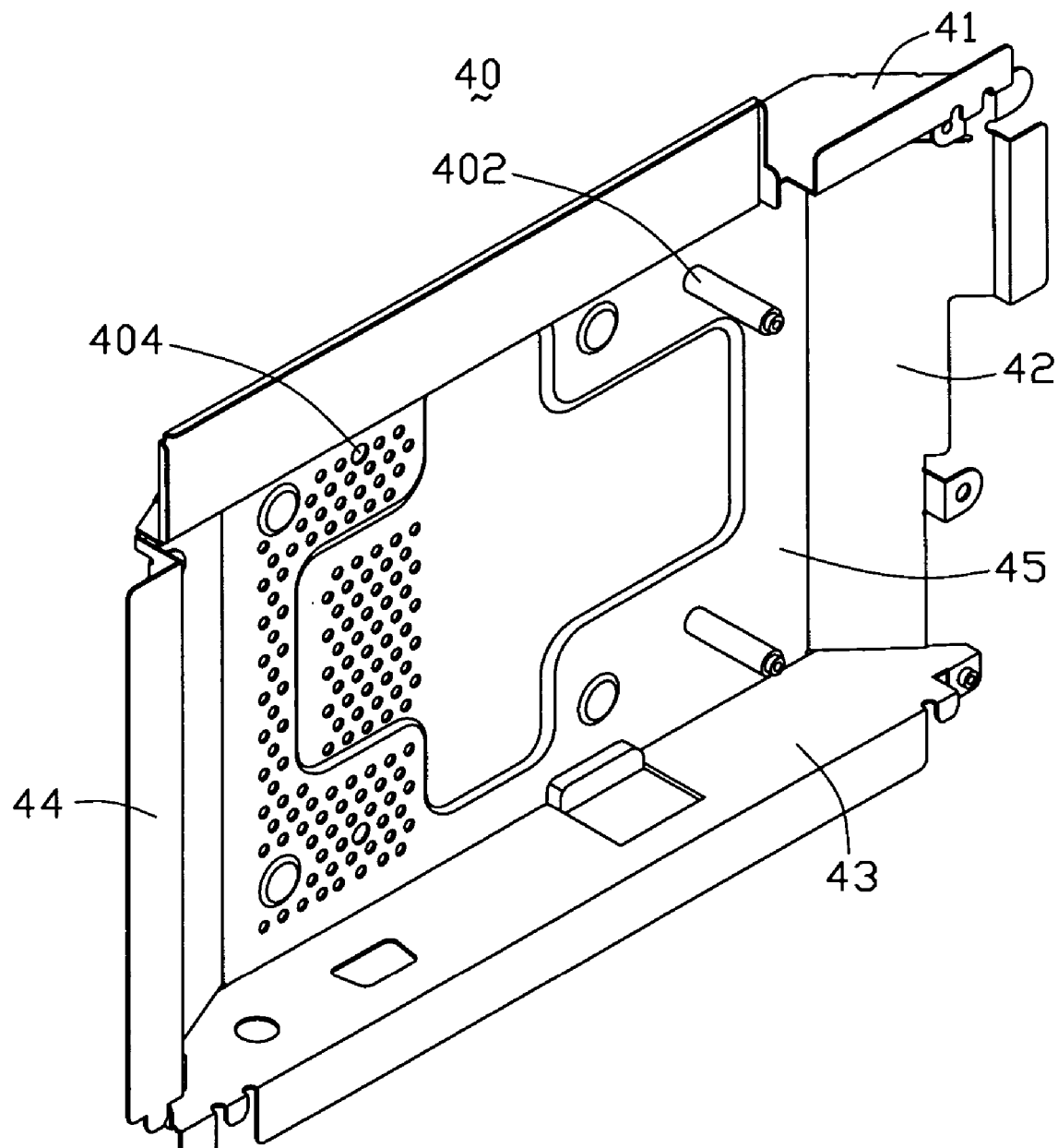
FIG. 3 is an isometric view of the metal shield of the flat panel display of FIG. 1.
Figure 4:
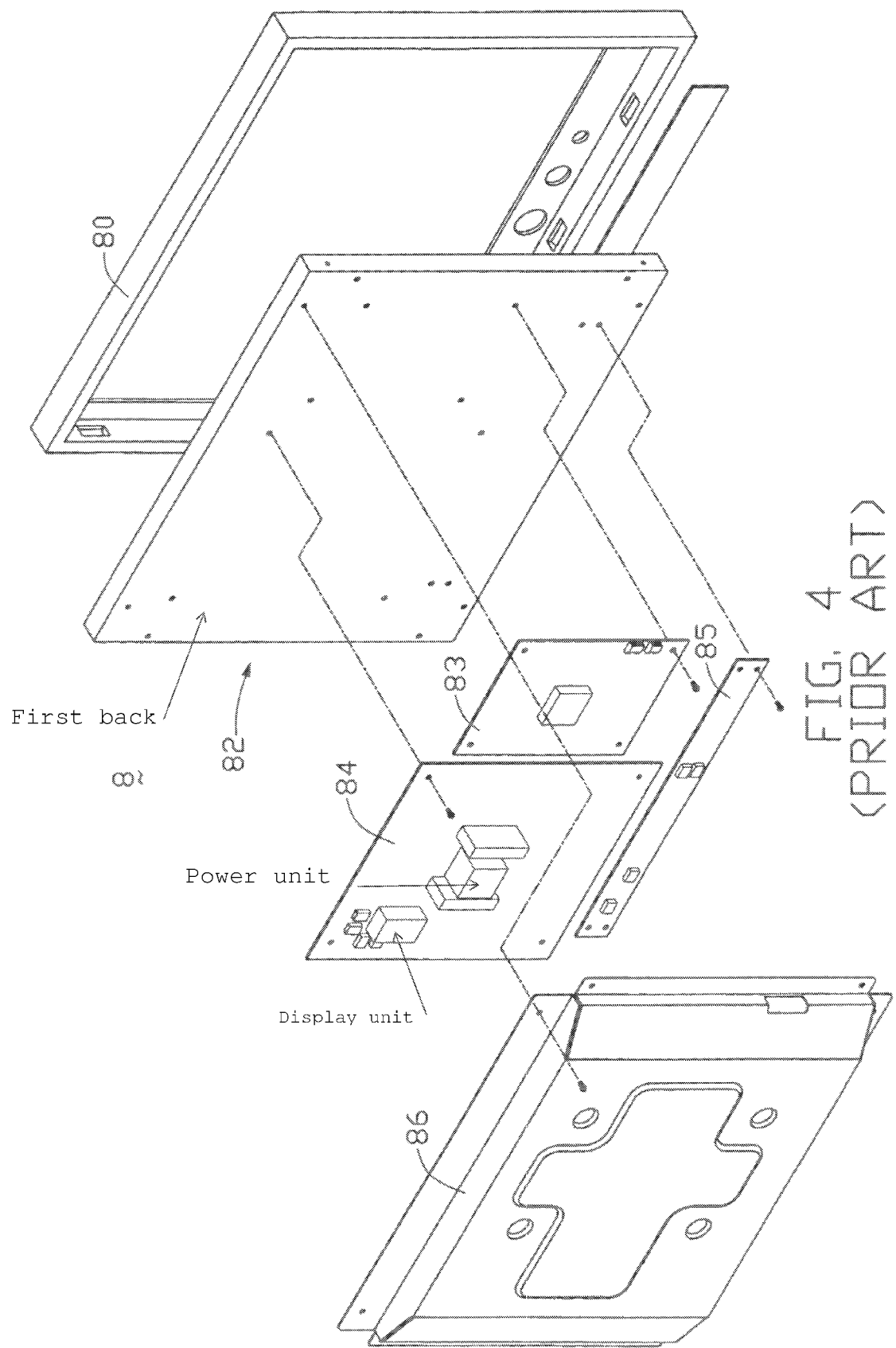
FIG. 4 is an exploded, isometric view of main components of a conventional flat panel display.

Referring also to FIG. 3, the metal shield 40 includes a plurality of side walls 41, 42, 43, 44, two studs 402 corresponding to the bolts 202 of the display panel 20, and a plurality of ventholes 404. A main body of the metal shield 40 and the side walls 41, 42, 43, 44 together define a first housing 45 for accommodating the circuit board 30 therein. An area occupied by the metal shield 40 is much smaller than that occupied by the display panel 20, and a little larger than that occupied by the circuit board 30. The rear frame 50 includes a second housing (not labeled) for accommodating the metal shield 40 therein. The metal shield 40 is preferably made from iron, and therefore can reduce or even eliminate EMI emitting from or transmitting toward the circuit board 30.

The flat panel display 1 can be assembled as follows: first, electrically connecting the circuit board 30 to the display panel 20; second, securing the circuit board 30 in the first housing 45 of the metal shield 40; third, securing the metal shield 45 at the first back 200 of the display panel 20; and finally, securing the display panel 20, the circuit board 30 and the metal shield 40 between the front frame 10 and the rear frame 50. In particular, the studs 202 and the bolts 204 of the display panel 20 cooperate with the through holes 307 of the circuit board 30 and the studs 402 of the metal shield 40 to secure the metal shield 40 and the circuit board 30 to the display panel 20.

The power unit 302, the interface unit 304 and the switch unit 306 are integrated on the circuit board 30, which enables convenient assembly of the flat panel display 1. Furthermore, the circuit board 30 is accommodated in the first housing 45 of the metal shield 40. Therefore the area occupied by the metal shield 40 is substantially the same as the area occupied by the circuit board 30, which area is smaller than that occupied by the display panel 20. More particularly, the area occupied by the metal shield 40 is much smaller than that occupied by the display panel 20, and a little larger than that o occupied by the circuit board 30. Thus, a weight and a cost of the flat panel display 1 can be reduced.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A flat panel display, comprising:
   a display panel having a first back;
   a metal shield secured at the first back of the display panel and comprising a first housing portion adjacent the first back of the display panel;
   a display unit, a power unit and a switch unit integrated on a single circuit board that is accommodated in the first housing portion; and
   a first frame and a second frame cooperatively accommodating the display panel and the metal shield therebetween.

2. The flat panel display as claimed in claim 1, wherein an area occupied by the metal shield is smaller than a corresponding area occupied by the display panel.

3. The flat panel display as claimed in claim 1, wherein an area occupied by the metal shield is substantially the same as a corresponding area occupied by the circuit board.

4. The flat panel display as claimed in claim 1, wherein the circuit board is electrically connected with the display panel.

5. The flat panel display as claimed in claim 1, wherein the metal shield is made from iron.

6. The flat panel display as claimed in claim 1, wherein the circuit board further comprises a power socket arranged at an edge thereof.

7. The flat panel display as claimed in claim 1, wherein the circuit board further comprises a video graphics array socket arranged at an edge thereof.

8. The flat panel display as claimed in claim 1, wherein the circuit board further comprises an audio socket arranged at an edge thereof.

9. The flat panel display as claimed in claim 1, wherein the metal shield comprises a plurality of ventholes formed thereon.

10. The flat panel display as claimed in claim 1, wherein the second frame comprises a second housing portion that accommodates the metal shield therein.

11. The flat panel display as claimed in claim 1, wherein the display panel further comprises a plurality of studs for securing the circuit board thereto.

12. The flat panel display as claimed in claim 11, wherein the circuit board further comprises a plurality of through holes corresponding to the studs of the display panel.

13. A flat panel display comprising:
    a display panel having a first back;
    a metal shield positioned behind the first back of the display panel and comprising a first housing portion adjacent the first back of the display panel; and
    a display unit, a power unit and a switch unit integrated on a single circuit board that is accommodated in the first housing portion; wherein
    a rear frame is located behind said metal shield and is dimensioned to be larger than said metal shield to enclose said metal shield therein; and
    a front frame is located in front of the display panel and cooperates with the rear frame to accommodate the display panel and said metal shield therebetween.

14. A flat panel display, comprising:
    a display panel having a first back;
    a single circuit board located behind said display panel;
    a metal shield located behind said single circuit board and further enclosing said single circuit board;
    a display unit, a power unit and a switch unit integrated on said single circuit board that is accommodated in the metal shield;
    a non-metal rear frame located behind the metal shield; and
    a front frame located in front of said display panel cooperating with the rear frame to accommodate said display panel and the metal shield therebetween.

15. The flat panel display as claimed in claim 13, wherein the rear frame comprises a second housing portion that accommodates said metal shield therein.

16. The flat panel display as claimed in claim 14, wherein the rear frame comprises a housing portion that accommodates the metal shield therein.

* * * * *